July 8, 1952  O. H. SCHMITT  2,602,884
FIELD STRENGTH RECORDER
Filed Feb. 6, 1947
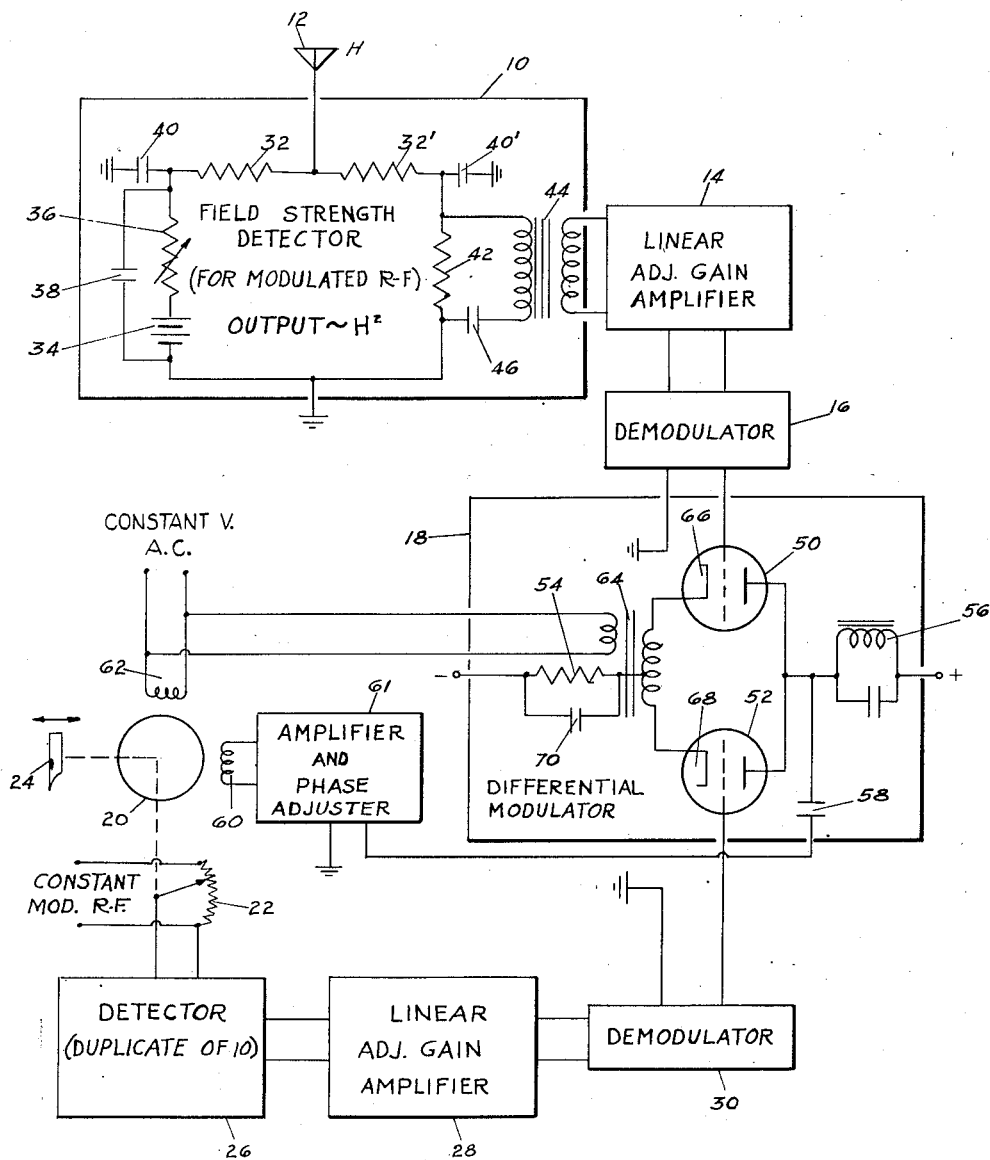
INVENTOR.
OTTO H. SCHMITT
BY
ATTORNEY Patented July 8, 1952

2,602,884

UNITED STATES PATENT OFFICE 2,602,884

FIELD STRENGTH RECORDER

Otto H. Schmitt, Mineola, N. Y., assignor to the United States of America as represented by the Secretary of the Navy Application February 6, 1947, Serial No. 726,932

10 Claims. (Cl. 250—2)

This invention relates to indicators or recorders, especially those adapted for measurement of radio-field strength. A primary object is to provide an indicator system responsive to radiation-field strength according to a definite mathematical function, as for example, a linear function. A further object is to eliminate an unwanted characteristic of a detector forming part of an electrical indicating or recording organization. A further object is to provide a system for taking the square root of a given electrically represented quantity. Further novel features and their purposes will be apparent from the following detailed disclosure of a specific embodiment of the invention.

According to the invention, a detector element, the output of which may be some nonlinear function of the phenomenon detected, such as radiation-field strength, is arranged to drive a linear amplifier and a demodulator or rectifier the output of which is proportional to the detector output. This output signal is used to control a follow-up system including a motor which positions a recording pen or equivalent indicator. The motor drives a potentiometer or or equivalent device which may be linear or tapered according to the desired mathematical function. A constant carrier voltage with modulation similar to that detected by the first-mentioned detector is impressed on the potentiometer. The output of this potentiometer is demodulated, linearly amplified and rectified and the resulting output is compared with the first-mentioned demodulator output similarly amplified and rectified. Any discrepancy between the two output signals is utilized in a novel differenal modulator for providing a motor-control signal.

One form of detector that may be used can be arranged to yield an output that is accurately proportional to the square of the impressed signal, neglecting second-order deviations. Since the recorded or indicated result is the linear representation of the quantity measured, it is evident that the system described effectively takes the square root of the detector output.

The single figure is a block diagram of a preferred embodiment of the invention including the specific wiring diagram in portions. The description of this embodiment follows:

The specific recording organization to be described is useful for quickly obtaining field patterns of antennas. An audio-modulated carrier is transmitted from a fixed source. The test antenna, which may be mounted in a vehicle, is rotated about an appropriate axis. A servo system (not shown) rotates a recording table (not shown) coordinately with the antenna, while a stylus plots relative field strength on polar coordinates.

Detector 10, of which the structure and operation will be described hereinbelow, yields an output voltage substantially proportional to the square of the field strength at antenna 12. The numerals are those in the drawing. This output voltage is amplified in linear amplifier 14 the gain of which is adjustable, extending upward of 20 decibels for the weak output of the particular detector used. The amplifier output is demodulated or rectified by a suitable demodulator or rectifier 16 and the resulting D.-C. voltage is impressed on a differential modulator 18 the output of which, in turn, controls two-phase motor 20. A potentiometer 22, the instant position or setting of which is coordinated with a recording stylus or indicator 24, impresses a variable portion of a constant-voltage modulated radio-frequency signal on a detector 26. The potentiometer may be linear, or it may be appropriately tapered if other than linear recording is desired. In the illustrated embodiment the potentiometer is deemed to be linear for purposes of explanation. The detected output is linearly amplified in unit 28, demodulated in unit 30 and this signal is applied to the differential modulator 18. The detector, amplifier and demodulator associated with potentiometer 22 are duplicates of detector 10, amplifier 14 and demodulator 16, respectively. Modulator 18 yields a motor-control output only when there are unequal input voltages from demodulators 16 and 30. Consequently, the position of indicator or stylus 24 linearly represents the signal strength on antenna 12.

The details of detector 10 will now be described. They are to be appropriately duplicated in the construction of detector 26.

This detector is intended to be responsive to very high radio frequencies. In a test instance, a 10,000 megacycle per second modulated carrier was to be demodulated, the demodulated signal then being taken as a measure of the field strength at antenna 12. It is known that resistance elements having an appreciable temperature coefficient of resistance but low thermal inertia can be arranged to vary slightly in resistance at an audio frequency due to heating by a signal varying at audio frequency, and will have uniform characteristics almost without regard to the carrier frequency used. In the present instance, a pair of fuses 32, 32' of the type used for protection of delicate meters are series-connected and heated to an effective level by D.-C. power supply 34 through bias-current adjusting resistor 36. This bias-current supply means is bypassed for audio frequencies by capacitor 38. The junction of resistors 32, 32' is connected to antenna 12 while the terminals of series circuit 32, 32' are bypassed to ground for R.-F. by means of capacitors 40, 40'. In series with the D.-C. bias circuit and the series-connected fuses 32, 32' is an A.-F. output circuit comprising resistor 42 in parallel with the primary of output transformer 44, blocking capacitor 46 being interposed in the primary circuit to prevent D.-C. saturation of this transformer.

In operation, the D.-C. bias current merely raises the temperature of fuses 32, 32' to that point where they are most effective and efficient as detectors. The antenna voltage developed as the result of the field strength of the modulated transmission is impressed across units 32, 32' effectively in parallel as to R.-F., between antenna 12 and ground. Thus, were each fuse 32 of 100 ohms, the two in parallel would match an antenna line of 50 ohms. The bias current through fuses 32, 32' in series will vary because of the variable temperature according to the signal modulation. The heating of fuses 32, 32' varies according to the square of the R. M. S. signal voltage which is proportional to the field-strength. Thus, the A.-F. output impressed across resistor 42 and the primary of transformer 44 through D.-C. blocking capacitor 46 varies as the square of the field strength detected.

The variation in resistance of the fuses due to heating by the modulated signal is small compared with its total resistance. Hence the A.-C. power developed because of resistance changes is quite small. If the A.-F. load circuit across fuses 32, 32' in series is made equal in impedance to the resistance of those fuses, it will be seen that, even were there a significant resistance change, that change would have a negligible effect on the amount of A.-C. power that is developed. The power fluctuation is then essentially dependent only on the field strength. Considering the substantial constancy of the resistance and considering the impedance matching, the power variation due to resistance change becomes a differential of second order and is negligible. If resistor 42 is comparatively large, the primary of transformer 44 should be 200 ohms to match the impedance of 100-ohm fuses in series, the impedance of the bypassed bias supply being negligible.

Detector 26 is essentially the duplicate of detector 10. It is energized by means of a carrier of the order of 50 kilocycles, with the same modulation frequency as that of the test signal. It would not be possible to separate the A.-F. output from detector 26 from the input were the carrier omitted and the modulation applied to the detector directly.

The detector elements described are fuses, in the preferred embodiment, that are responsive to all carrier frequencies alike. If a crystal rectifier or the like were used as a detector, the broad system would be effective to correct for nonlinearly in the detector characteristic even though it were other than the square of the impressed signal. Rectifiers and the like that respond differently to different radio frequencies require correction for the different carrier frequencies impressed at 12 and at 22. Alternatively, the same carrier frequency can be impressed at 22 as that of the field being investigated, with appropriate attention given to the construction or replacement of potentiometer 22. Where a rectifier or equivalent is used in place of a fuse as a detector, the foregoing discussion relevant to extracting the square root of the quantity does not apply. The important result, elimination of the detector characteristic at a constant carrier frequency, is retained with detectors generally, thereby providing linear indication of the test voltage applied to detector 10.

The details and operation of differential modulator 18, which is believed to be novel, will now be set forth. A modified cathode-phase inverter having amplifier tubes 50, 52 has a common bias resistor 54 and a common load impedance 56. The impedance here takes the form of a resonated A.-F. choke, tuned to the motor operating frequency. A tap (not shown) in the B-supply is grounded. Through coupling capacitor 58 and amplifier 61 which includes a phase adjustor, the differential modulator output energizes winding 60 of motor 20. Motor winding 62 is energized from the same constant-voltage A.-C. supply that energizes transformer 64 in the modulator. The transformer secondary is connected at its center-tap to cathode resistor 54, and joined at its terminals to cathodes 66 and 68 of tubes 50 and 52, respectively.

In operation, the total plate current of tubes 50 and 52 will be constant, averaged from cycle to cycle by capacitor 70 shunting resistor 54. Any difference in grid potential of tubes 50 and 52 causes an unbalanced average plate current division between tubes 50 and 52 and an associated difference in transconductance between the tubes, thereby causing an A.-F. output to be realized. The phase is adjusted so that motor 20 operates the slide of potentiometer 22 in the direction to restore equality between the D.-C. grid voltages of tubes 50 and 52.

It is desirable that the output of rectifiers or demodulators 16 and 30 be proportional to their input signals, so that the motor may have equal torque for all positions of adjustment of potentiometer 22 and for equal amounts of unbalance between the output voltages from demodulators 16 and 30.

What is claimed is:

1. A control circuit for deriving a voltage signal corresponding to the difference in magnitude of a pair of input signals, comprising a pair of electron discharge tubes each having a cathode, an anode and a control grid, a common anode circuit for said tubes including a source of voltage to energize the same, means alternately biasing said cathodes at a predetermined frequency value corresponding to the desired frequency value of said derived voltage signal, and means applying said input signals to the respective control grids, whereby a difference in grid voltage of one of said tubes relative to the other is effective to produce the said voltage signal.

2. The circuit defined in claim 1 wherein said common anode circuit comprises a conductive connection between said anodes and a parallel resonant circuit connection between said conductive connection and said source of energizing voltage.

3. The circuit defined in claim 1 wherein said cathode-biasing means comprises a source of alternating potential, and means inductively coupling said source of alternating potential to said cathodes for oppositely phased energization thereof.

4. A motor control circuit comprising a pair of tubes, each having at least anode, cathode and grid electrodes, an alternating-current supply source connected to energize said tubes in phase opposition, a reversible motor having a pair of field coils, means connecting one of said field coils in the anode circuit of each of said tubes, the other of said field coils being connected for energization from said supply source, and means simultaneously supplying alternating-current control signals to the grid electrodes of each of said tubes to energize said reversible motor for rotation in one direction or the other when the alternating signals on the grid electrodes of said tubes are unequal.

5. Apparatus for linearly indicating a quantity represented by an amplitude-modulated carrier, such as radiation field strength, comprising an amplitude-modulation detector, an indicator, a second amplitude-modulation detector, means for applying an amplitude-modulated carrier to said second detector proportional in voltage to the displacement of said indicator from zero, and means jointly controlled by said detectors for positioning said indicator, each said amplitude-modulation detector comprising separate circuits including a pair of resistors having a common terminal adapted for connection to a source of radio-frequency amplitude-modulated electromagnetic carrier waves, means including a source of bias voltage for maintaining said resistors at a predetermined voltage above ground, and an output circuit connected to deliver a voltage signal corresponding in amplitude to the square of the magnitude of said carrier waves.

6. A device for extracting the square root of an electrically-represented quantity comprising an amplitude-modulation detector including a pair of resistors having a common terminal adapted for connection to an antenna disposed to pick up radio-frequency amplitude-modulated carrier waves, and means including a source of unidirectional bias voltage for maintaining said resistors at a predetermined voltage relative to the ground, said detector being adapted to yield an output proportional to the square of the quantity, an indicator, means coordinated with said indicator for applying a radio-frequency amplitude-modulated carrier to said detector proportional in voltage to the displacement of the indicator from zero, and means jointly controlled by said electrically-represented quantity and the output of said detector for positioning said indicator.

7. Electromagnetic radiation-field-recording apparatus comprising an antenna for receiving a signal corresponding to the strength of the field surrounding said antenna, first detector means responsive to said received signal to provide a first output voltage proportional to the square of the carrier of said signal, a recorder, motive means for actuating said recorder, second detector means adapted to be energized from a source of modulated high-frequency energy and responsive to a signal from said source to provide a second output voltage, the modulation of said source being substantially equal to the modulation of the wave energy initiating the radiation field to be tested, and means responsive to the difference of said first and second output voltages for energizing said motive means to actuate said recorder, said first and said second detector means being substantially similar to each other, each comprising a pair of resistors having a common junction adapted for connection to a source of modulated carrier waves, the junction of said first detector being connected to said antenna and the junction of said second detector being connected to said source, and means for biasing said resistors at a predetermined unidirectional voltage relative to ground.

8. Electromagnetic radiation-field-recording apparatus comprising an antenna for receiving a signal corresponding to the strength of the field surrounding said antenna, first detector means responsive to said received signal to provide a first output voltage proportional to the square of the carrier of said signal, a recorder, motive means for actuating said recorder, second detector means adapted to be energized from a source of modulated high-frequency energy and responsive to a signal from said source to provide a second output voltage, the modulation of said source being substantially equal to the modulation of the wave energy initiating the radiation field to be tested, and means responsive to the difference of said first and second output voltages for energizing said motive means to actuate said recorder, said last-named means comprising a first and second electron discharge tube each having a cathode, an anode and a control grid, a common anode circuit for said tubes, means alternately biasing said cathodes at the normal operating frequency of said motive means, and means applying said first and second output voltages to the respective grids of said first and second tubes, whereby a difference in grid voltage of one of said tubes relative to the other is effective to produce an output voltage for driving said motive means.

9. Radiation-field-recording apparatus comprising means for receiving a signal corresponding to the strength of the field, first detector means responsive to said received signal to provide a first output voltage, a recorder, motive means for actuating said recorder, said motive means having input windings, a second detector means adapted to be energized from a source of modulated wave energy and responsive to a signal from said source to provide a second output voltage, and means responsive to the difference of said first and second output voltages for energizing said motive means to actuate said recorder, said last-named means comprising first and second electron discharge tubes each having a cathode, an anode and a control grid, a common anode circuit for said tubes, means alternately biasing said cathodes at the frequency applied to said windings to operate said motive means at a predetermined speed, and means applying said first and second output voltages to the respective grids of said first and second tubes.

10. A circuit for deriving a signal corresponding to the difference in magnitude of a pair of signals, comprising a pair of electron discharge tubes each having a cathode, an anode and a control grid, a common anode circuit for said tubes including a source of voltage to energize the same, means alternately biasing said cathodes at a predetermined frequency value corresponding to the desired frequency value of said derived voltage signal, and means applying said input signals to the respective control grids.

OTTO H. SCHMITT.

REFERENCES CITED

The following references are of record in the file of this patent:

UNITED STATES PATENTS

| Number | Name | Date |
|---|---|---|
| 2,119,607 | Sterba | June 7, 1938 |
| 2,267,184 | Bagno | Dec. 23, 1941 |
| 2,314,029 | Bond et al. | Mar. 16, 1943 |
| 2,372,062 | Dorsman | Mar. 20, 1945 |
| 2,394,892 | Brown | Feb. 12, 1946 |
| 2,407,075 | Gurewitsch | Sept. 3, 1946 |
| 2,519,418 | Urick | Aug. 22, 1950 |